April 14, 1936.  W. M. WEST  2,037,105
LAMINATED ARTICLE AND METHOD OF MANUFACTURE
Filed Aug. 14, 1933  3 Sheets-Sheet 3
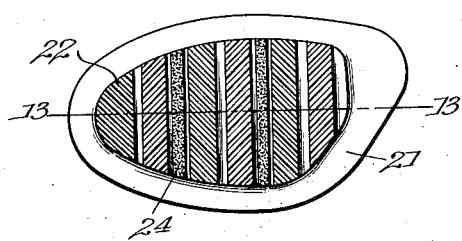
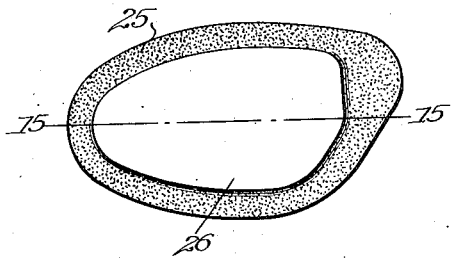
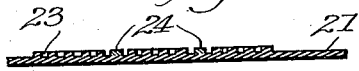
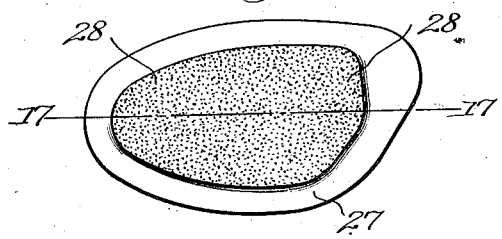
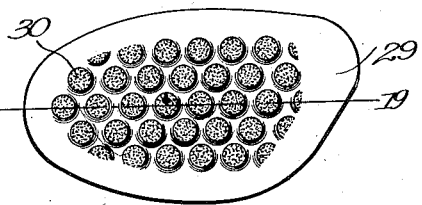
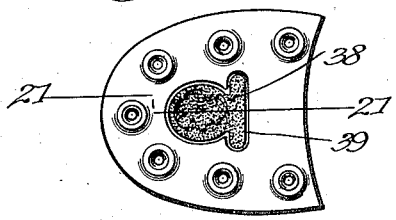
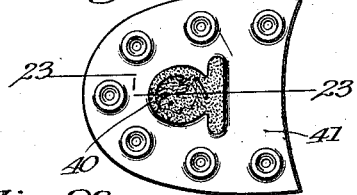
Inventor
William M. West
By Cushman Darby & Cushman
Attorneys April 14, 1936. W. M. WEST 2,037,105
LAMINATED ARTICLE AND METHOD OF MANUFACTURE
Filed Aug. 14, 1933 3 Sheets-Sheet 1
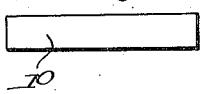
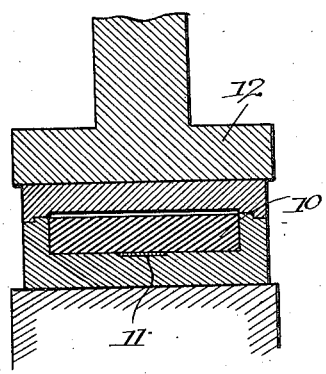
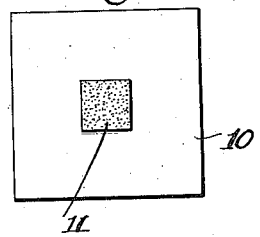
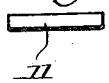
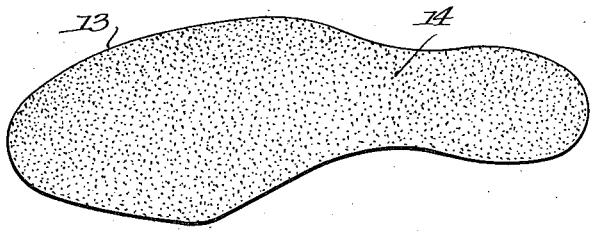
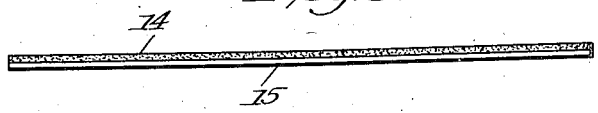
Inventor
William M. West.

William M. West

Patented Apr. 14, 1936

2,037,105

UNITED STATES PATENT OFFICE 2,037,105

LAMINATED ARTICLE AND METHOD OF MANUFACTURE

William M. West, Baltimore, Md., assignor to Crown Cork & Seal Company, Inc., Baltimore, Md., a corporation of New York Application August 14, 1933, Serial No. 685,111

14 Claims. (Cl. 18—59)

My invention relates to laminated materials and particularly to such structures comprising a layer of rubber and a layer of a different material, for example one having cushioning and friction-resistance characteristics, and consisting of comminuted cork and rubber.

I have particularly in mind a laminated structure comprising a base layer of vulcanized rubber, to the surface of which is united a layer of a vulcanized and expanded material comprising comminuted cork and cellular rubber, as set forth in my copending application, Serial No. 662,633, filed March 24, 1933, of which this application is a continuation in part. The two layers may be coextensive with each other or one of smaller dimension than the other, or again small dimensional areas of one material will be united to the surface of the other material in spaced relation thereon.

The two layers are vulcanized together, that is the rubber base is initially in unvulcanized condition, while the expanded cork and rubber layer is vulcanized, and the two are adherently combined by the vulcanization of the base.

Laminated materials of this type having a friction surface and a cushioning characteristic are useful for the wearing surfaces of shoes, that is in the manufacture of athletic footwear having so-called one-piece rubber soles comprising an integral whole sole and heel, or in connection with either the usual rubber sole or rubber heel of an article of footwear.

The invention is further applicable in the manufacture of products such as footwear, hot water bottles, inner tubes for tires and tire casings, and, in fact, in connection with numerous articles made of rubber, in which an emblem or distinguishing marking is desired. That is, there is applied to the rubber base a layer of the vulcanized and expanded cork and rubber structure of suitable shape and size and suitably colored with a rubber pigment, the same being vulcanized to the base when the latter is vulcanized and thereby secured to the base.

Heretofore, in connection with rubber articles, it was the practice to employ as a marking, a piece or layer of unvulcanized rubber in sticky condition having a tendency to curl, or a piece or layer of partially vulcanized rubber, each suitably colored. Such expedients are objectionable for the reason, (1) they are sticky, and (2) have a tendency to flow or run during the vulcanization. This flowing or running of the marking material produces a very poor appearing emblem, in that it is not bonded cleanly to the base, and edges of the marking are irregular. Furthermore, in the case of a partially vulcanized gum, this has been very expensive due to the necessity for preliminary calendaring and curing to condition the gum, i. e. the vulcanization is not carried to a point where the gum loses its sticky characteristic so that the gum layers or pre-cut portions must be supported on a backing with the result that they must be individually peeled from the backing and individually handled. Hence, the step of calendaring and curing was a lost motion since the rubber remained sticky and possessed a tendency to curl. These conventional materials have, moreover, a tendency to curl and, therefore, are difficult to handle and position in the mold, where it is highly desirable that the layers be permanently flat in order to obtain a perfect union.

The vulcanized and expanded cork and rubber structure, preferably forming one of the laminae of this invention, is, of course, prevulcanized and expanded, so that it is in a final set condition. Hence, when applied to an unvulcanized base and the latter subjected to vulcanization, the cork and rubber structure does not run or flow, or lose its shape. In fact, it is substantially unaffected by the vulcanizing operation. Simultaneous with the vulcanizing operation, however, the cork and rubber structure is bonded to the base. Stated briefly, the vulcanized and unvulcanized layers are united without the use of an adhesive. The prevulcanized cork and rubber structure is bonded to the unvulcanized base by the vulcanization step, and as stated does not flow into the base, but, on the contrary, maintains its permanent shape and form. The laminated material exhibits characteristics disclosing that the cork and rubber structure is vulcanized to the base.

The advantages of using a prevulcanized and expanded cork and rubber structure are numerous. In the first place, it is not sticky, and second, it has a final form, which is not affected by the vulcanization of the base. Moreover, it will lie flat upon the surface of the base, assuring a firm and complete connection between the two layers, by reason of the adherent bonding obtained through vulcanization of the base. These particular characteristics of permanence and tendency to remain flat are important where small pieces are applied to the rubber base to serve as distinguishing markings. It permits the small pieces to be easily handled in the mold and since the material does not run into the base, a clear and distinct marking of any suitable color will result.

Referring to the drawings,

Figure 1 is a view in section showing the manner in which a vulcanized layer of the expanded structure is combined with an unvulcanized layer of rubber or base material to form the final article.

Figure 1a is a side elevation of the unvulcanized layer.

Figure 1b is a side elevation of the vulcanized layer.

Figure 1c is a top view of the article made in accordance with the showing in Figure 1 utilizing the layers of Figures 1a and 1b.

Figure 2 is a top view of a whole sole and heel as used for athletic footwear.

Figure 3 is an elevational view on the side edge of Figure 2.

Figure 9 is a top view of a rubber heel having a plurality of spaced anti-frictional cushion surfaces, including an emblem, such surfaces being formed of vulcanized and expanded comminuted cork and rubber.

Figure 12 is a top view of a rubber sole having applied to the wearing surface thereof spaced strips of material consisting of a vulcanized and expanded comminuted cork and rubber structure and forming cushioning and anti-frictional means.

Figure 13 is a section on the line 13—13 of Figure 12.

Figure 14 is a view of a modification in which the base layer is formed of vulcanized and expanded comminuted cork and rubber and the top layer is composed of vulcanized rubber of smaller dimension.

Figure 15 is a section on the line 15—15 of Figure 14.

Figure 16 is a view in elevation showing the base layer formed of vulcanized rubber and the surface layer of vulcanized and expanded comminuted cork and rubber of smaller dimension.

Figure 17 is a section on the line 17—17 of Figure 16.

Figure 18 is a view in elevation of a sole having applied to the surface thereof a multiplicity of spaced projections formed of expanded and vulcanized comminuted cork and rubber.

Figure 19 is a sectional view on the line 19—19 of Figure 18.

Figure 20 is a top view of a heel similar to Figure 9, in which the emblem is disposed in a recess in the heel surface.

Figure 21 is a section on the line 21—21 of Figure 20.

Figure 22 is a top view of a rubber heel similar to Figure 10, wherein the emblem constitutes a frictional and cushion surface and projects above the plane of the heel as in Figure 9.

Figure 23 is a section on the line 23—23 of Figure 22.

Figure 4:
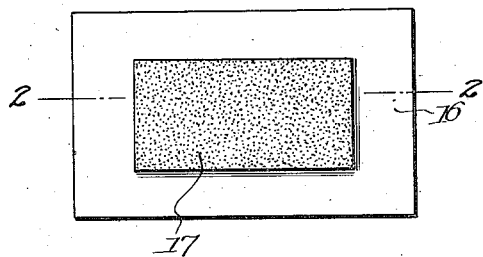
Figure 4 is a top plan view showing diagrammatically a base of rubber having applied thereto a layer of smaller dimension comprising vulcanized and expanded comminuted cork and rubber.

In referring to a vulcanized and expanded structure of comminuted cork and rubber, I mean the materials set forth and illustrated in my said copending application. This material is in the form of a close network of expanded structure and vulcanized, having as its main body ingredients comminuted cork and cellular rubber with suitable plasticizers and softening agents. The close network provided is impervious to gases and liquids and the presence of the cork particles, and the cellular nature of the rubber, produces a frictional surface. The product is characterized by having the optimum resilient properties of the body members available and, in fact, the rubber and cork cooperate to produce both a cushion and frictional effect, which is the maximum result of the combination of their several qualities.

The cork particles are of a size to retain their cellular nature and the mass is expanded and the rubber rendered cellular in situ and immediately vulcanized.

The rubber substantially encases the cork particles and is adherent to the faces thereof. The cork particles constitute a body material as distinguished from a filler, and the rubber, the cellular walls of which are united to the cork particle faces, acts to (1) bond the cork particles forming a cork and rubber network, and (2) resiliently and permanently fix or position the particles in spaced relation, preventing compacting thereof.

The product is flexible and resistant to creasing and bending strains without cracking, elastic, tough, impervious, has an optimum of resilience, i. e. compression and rebound, and the particle faces comprise a substantial portion of the surface area. Also, sheets or layers of this material of various dimensions are free from any tendency to curl and do not warp or lose their shape when wetted and subsequently dried. In other words, the sheets or layers or pieces of the vulcanized and expanded cork and rubber remain permanently flat and are not objectionably affected by conditions of temperature and moisture.

The material is produced by a method of procedure, wherein (a) molded sheets or pieces of any required shape will be formed, and (b) continuous strip material will be produced, which may be suitably cut or punched, as desired.

The method is carried out with nice control of the ratio of cork and rubber and regulation of the chemical action, whereby the cellular character of the rubber and of the expanded material is determined. In connection with the latter, the method provides for expanding the material and rendering the rubber cellular by means of a gas forming or blowing agent in situ, that is in the form of the final product, i. e. block, rod or strip form or any desired shape, and substantially immediately thereafter vulcanizing the mass.

In carrying out the method of the invention, the mixture of cork and rubber and the chemical constituents, i. e. accelerators and blowing and vulcanizing agents and/or plasticizers and softening agents, are first prepared in the form of a partially vulcanized or set mass. This mass is placed in a mold, or formed into sheets and, in its partially set condition, is subjected to a blowing operation immediately followed by vulcanization, both steps taking place either in the mold or in the sheet forming means and being immediately consecutive. That is to say, the mass is expanded simultaneously with the step of rendering the rubber cellular and immediately vulcanized, whereby the product is obtained in its maximum blown or expanded and shaped condition. In the case of sheet material, which is employed in this invention, a mold is usually omitted, the partially set strip material being passed in sheets through a heating chamber and expanded and immediately vulcanized therein.

In this specification, the material just described will be referred to as vulcanized and expanded comminuted cork and rubber, and the rubber body to which it is united will be referred to as the base. The vulcanized and expanded cork and rubber is in its final set condition, whereas the rubber base or body is initially unvulcanized. As heretofore stated, layers of the two materials are formed into a strong tenacious union by the vulcanization step, whereby the base is vulcanized.

Referring to Figure 1, I have illustrated at 10 any suitable base or body of unvulcanized rubber. The numeral 11 indicates a layer of the vulcanized and expanded cork and rubber.

The vulcanizing mold is indicated at 12 and the two materials are disposed therein and subjected to the usual conditions surrounding vulcanization. The material 11 is not affected by this step. The rubber body 10 is vulcanized in the mold 12 and simultaneous with its vulcanization, the layer 11, which lies flat upon the rubber body, is adherently bonded thereto. No adhesive is employed and the union between the two layers is obtained solely by vulcanization of the rubber base or body. In the present instance, the layer 11 is a small relatively thin piece and the base is disclosed as being thicker and larger. This is simply representative of the process which may be applied in connection with all characters of rubber articles, and while usually the layer 11 is thin with respect to the base, it may be of equal or greater thickness than the base.

In Figure 2 of the drawings, I have shown a whole sole 13 comprising a sole and heel integrally connected, as is customary with athletic footwear. The tread surface of the whole sole 13 comprises a layer of vulcanized and expanded comminuted cork and rubber 14, coextensive with the rubber base or body 15. If desired, the frictional and cushion surface 14 may be applied only to the sole or to the heel. It is to be observed upon reference to Figure 3, that the union between the two layers is substantially integral and, as stated, this is obtained due to the uniformly flat condition of the cork and rubber layer and its continuous contact with the corresponding flat surface of the rubber layer, whereby the vulcanized and unvulcanized layers are adherently bonded together simultaneously with the vulcanizing of the rubber layer. Also, it is to be observed that there is no running or flowing of the layer of comminuted cork and rubber into the rubber body or base.

Figure 5:
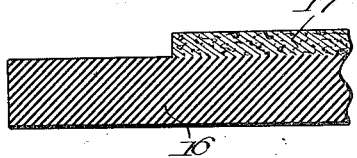
Figure 5 is a section on the line 2—2 of Figure 4, showing the union of the layers.

Referring to Figure 4, I have illustrated at 16 a base of rubber, having applied to one surface thereof a layer 17 of vulcanized and expanded comminuted cork 17 and rubber. The layer 17 is of less dimension than the layer 16. Such a structure may be used for bath mats and similar articles. In Figure 5, it will be observed that the union between the two layers is an integral one obtained by the vulcanization of the rubber body and entirely free from any flowing or running of the cork and rubber layer.

Figure 6:
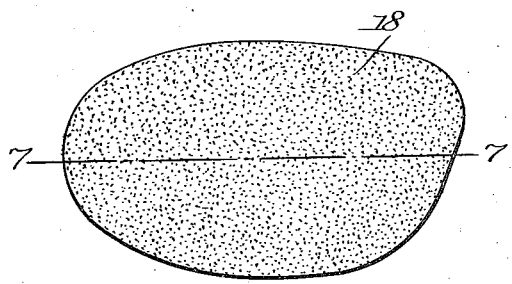
Figure 6 is a top plan view of a shoe sole having a layer of vulcanized and expanded comminuted cork and rubber.
Figure 7:
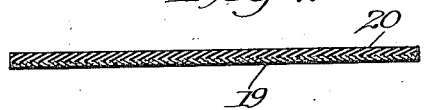
Figure 7 is a section on the line 7—7 of Figure 6, showing how the base and face layers are integrally united, the two layers being coextensive.

In Figures 6 and 7, I have shown a sole or tap at 18 having the wearing surface of comminuted cork and rubber 19 and the base 20 of rubber. This construction is substantially similar to that shown in Figures 2 and 3, but is applied to a sole only.

In Figures 12 to 19, I have illustrated various modifications. In Figure 12, the base or body 21 is of rubber having projecting rubber portions 22 extending transversely thereof, which are grooved to provide a frictional surface, as at 23. Interposed between the transverse projecting frictional areas 21, are a plurality of strips 24 of vulcanized and expanded cork and rubber structure. As many strips or layers as may be desired will be employed, and they may be positioned longitudinally or transversely as may also be the case with the grooved frictional rubber portions 22. The strips 24 are resilient and cushioning as described, and cooperate with the frictional portions, since they have a high co-efficient of friction. Moreover, these strips may be colored with various rubber pigments. For example, the rubber base and projecting portions will be formed of black rubber and the strips 24 of red rubber, giving a distinct eye appeal to the product.

In Figure 14, the base 25 is formed of vulcanized and expanded comminuted cork and rubber having applied to one surface thereof a layer of rubber 26. Either of the surfaces may constitute the wearing surface as desired and depending upon the particular type of shoe with which the sole is employed. In Figure 16, the construction shown in Figure 14 is reversed and the base 27 is formed of rubber having an area or layer of less dimension applied thereto and formed of vulcanized and expanded comminuted cork and rubber 28. Likewise, either surface may constitute the wearing portion as desired.

In Figure 18, the base 29 is of rubber and has applied thereto a multiplicity of spaced, relatively small areas 30 composed of vulcanized and expanded comminuted cork and rubber. While I have shown this structure applied to a sole, it is also applicable to a heel or to the whole sole and heel shown in Figures 2 and 3. The projections 30 may be of various sizes and while indicated as being circular are not limited to this contour. As shown in Figure 19, they project above the vase constituting a cushion and frictional wearing surface.

It will be understood that in all of the articles mentioned the two layers, namely the vulcanized layer of comminuted cork and rubber and the initially unvulcanized layer of rubber, are united by the vulcanization of the latter according to the process described in connection with Figure 1.

Figure 8:
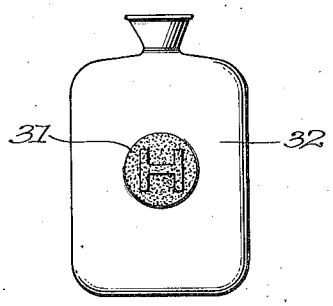
Figure 8 is a side elevation of a hot water bottle or ice bag having an emblem or marking thereon formed of the vulcanized and expanded comminuted cork and rubber structure.
Figure 10:
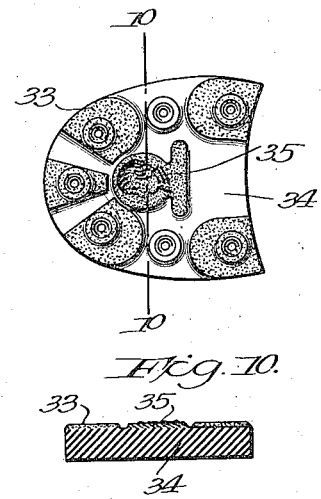
Figure 10 is a sectional view on the line 10—10 of Figure 9.

Referring to Figure 8, I have shown a layer of vulcanized end expanded comminuted cork and rubber 31 applied to a hot water bag or ice bag 32. In this figure, the layer is of a size to have the function of an emblem or distinct marking and will be suitably colored with relation to the color of the body of the bag. The expanded and vulcanized comminuted cork and rubber, while in its final vulcanized and expanded condition, possesses a plastic coefficient whereby when placed in the mold 12 a suitable design or initial may be impressed thereon. In Figure 8, I have indicated the emblem as comprising an initial impressed into the layer 31 and in Figure 9, the emblem has the form of a facial relief. Referring to Figure 9, a plurality of spaced layers of vulcanized and expanded comminuted cork and rubber 33 are applied to the heel body 34, forming cushion anti-friction means and the emblem 35, as with the spaced areas 33, extends above the plane of the heel, as shown in Figure 10, forming cushion, friction surfaces.

Figure 11:
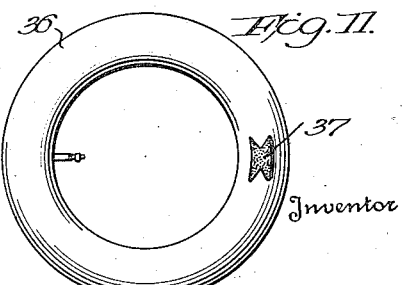
Figure 11 is a side elevation of a rubber inner tube or tire having an emblem applied thereto, as in Figure 8.

In Figure 11, I have shown an emblem or marking applied to a tire inner tube or tire casing 36, the emblem being indicated at 37.

In Figure 20, the emblem 38 is positioned within a recess 39 in the heel body, as illustrated in Figure 21, and in Figure 22, the emblem or marking 40 projects above the surface of the heel 41, as shown in Figure 23, forming a cushion, friction surface.

In connection with the application of a layer of vulcanized and expanded cork and rubber to form an emblem or marking upon a rubber body, as disclosed, it is to be understood that small pieces of appropriate size are cut or punched from a sheet and applied to the rubber body, as shown in Figure 1. These small pieces have the characteristic of lying flat upon the surface of the rubber body and are inherently free of any sticky characteristics. The material of the emblem or marking does not flow during vulcanization and a clean and regular line of connection between the marking and the body is obtained. This is important, since heretofore with uncured or partially cured gums employed for this purpose, the gum has a tendency to flow and produce a distorted line of connection, frequently so observable as to require reproduction or discarding of the article.

As stated, the invention comprises uniting a vulcanized and expanded layer of comminuted cork and rubber with an unvulcanized layer of rubber constituting the body or base by means of the vulcanization step. The resultant article, therefore, comprises two vulcanized layers, one of which is initially unvulcanized and the two layers are united by the vulcanization of the unvulcanized layer. This is accomplished by reason of the fact that the cork and rubber layer lies flat upon the corresponding surface of the body or base, assuring a continuous contact, whence the vulcanization will produce an adherent bond between the two over their entire adjacent surfaces. This is important in obtaining a substantially integral laminated structure. Where layers of smaller dimension are employed, or relatively small pieces or markings or emblems, this is particularly important, since the cork and rubber structure is not affected by vulcanization and hence does not run or flow, whereby a clean, sharp outline of the emblem or marking is produced.

The cork and rubber structure, as stated, is resilient and retains its life unimpaired, notwithstanding treatment in the vulcanizing press. Moreover, it has a substantial plasticity, whence designs may be impressed upon it. This permanence of the cork and rubber structure enables it to be used in a wide number of applications. Usually the cork and rubber structure is applied in relatively thin layers or strips, but it may be of equal thickness with that of the rubber base or of greater thickness.

The invention is very economical, since no adhesive application is necessary and the ordinary vulcanizing apparatus at present in use may be employed to produce either a laminated structure having coextensive layers, or a laminated structure in which the layers are of smaller dimension and/or arranged in spaced relation.

In connection with the various types of wearing surfaces for shoes indicated in the drawings, I have also applied the cork and rubber material around the edges of the rubber base, whereby the tread surface will consist of a rubber center and a marginal portion of the cork and rubber structure. Also, I have formed a tread with a cork and rubber center and a marginal area of rubber. The cork and rubber may be suitably colored, as will also be the case with the rubber, to produce a two-colored effect. In addition, I have also used transverse strips of cork and/or rubber, united to the marginal cork and/or rubber areas and suitably colored. In the manufacture of treads of this character, the marginal and central areas of the structures shown in Figures 12, 14, and 16 will be flush to form the composite and two-colored tread surface. That is, the smaller dimensional central portion is disposed in a recess or opening in the base and the two united by vulcanization, as described.

The articles produced in accordance with my invention show clearly that the union between the pre-vulcanized layer of cork and rubber and the vulcanized layer of rubber is a bond obtained by the vulcanization of the rubber layer.

Various modifications of the several structures shown may be produced, all of which are comprehended within the spirit of this invention.

I claim:

1. As an article of manufacture, a layer of a vulcanized expanded structure comprising comminuted cork and rubber, and a layer of vulcanized rubber united to said vulcanized expanded layer, said rubber layer being initially unvulcanized and said expanded layer being initially vulcanized, and the two layers united by the vulcanization of said rubber layer.

2. As an article of manufacture, a layer of a vulcanized expanded structure comprising comminuted cork and rubber, and a layer of vulcanized rubber, one of said layers of greater area than the other, said rubber layer being initially unvulcanized and said expanded layer being initially vulcanized, and the two layers united by the vulcanization of said rubber layer.

3. As an article of manufacture, a layer of a vulcanized expanded structure comprising comminuted cork and rubber, and a layer of vulcanized rubber coextensive with and united to said vulcanized expanded layer, said rubber layer being initially unvulcanized and said expanded layer being initially vulcanized, and the two layers united by the vulcanization of said rubber layer.

4. As an article of manufacture, a layer of vulcanized rubber, forming a base, and a layer of an expanded and vulcanized structure comprising comminuted cork and rubber united to a portion of the surface of the base, said rubber layer being initially unvulcanized and said expanded layer being initially vulcanized, and the two layers united by the vulcanization of said rubber layer.

5. As an article of manufacture, a layer of vulcanized rubber, forming a base, and a layer of an expanded and vulcanized structure comprising comminuted cork and rubber united to a portion of the surface of the base, said rubber layer being initially unvulcanized and said expanded layer being initially vulcanized, and the two layers united by the vulcanization of said rubber layer, said expanded layer forming a cushioning and anti-frictional surface.

6. As an article of manufacture, a layer of vulcanized rubber comprising a base, and a plurality of layers of smaller dimension than said base, and comprising a vulcanized and expanded structure of comminuted cork and rubber united to the surface of said base in spaced relation, the rubber layer being initially unvulcanized and said expanded layers being initially vulcanized and the two materials united by the vulcanization of said rubber layer, said spaced comminuted cork and rubber layers forming cushioning and anti-frictional surfaces on said base.

7. Shoe material adapted to constitute the wearing portion of the shoe comprising a base layer of vulcanized rubber and a superposed layer of a vulcanized expanded structure comprising comminuted cork and rubber united to said base.

8. Shoe material adapted to constitute the wearing portion of the shoe comprising a base layer of vulcanized rubber and a superposed layer of a vulcanized expanded structure comprising comminuted cork and rubber united to said base, said rubber layer being initially unvulcanized and said expanded layer being initially vulcanized and the two layers united by the vulcanization of the rubber layer, said vulcanized expanded structure forming a cushion and anti-frictional surface.

9. Shoe material adapted to constitute the wearing portion of the shoe comprising a base layer of vulcanized rubber, and a plurality of smaller dimension layers of a vulcanized expanded structure comprising comminuted cork and rubber united to said base and disposed in spaced relation on said base.

10. Shoe material adapted to constitute the wearing portion of the shoe comprising a base layer of vulcanized rubber, and a plurality of smaller dimension layers of a vulcanized expanded structure comprising comminuted cork and rubber united to said base and disposed in spaced relation thereon, said vulcanized and expanded layers constituting a cushion and anti-frictional surface on said base.

11. The method of making a rubber-like structure which comprises preparing a vulcanized expanded structure of comminuted cork and rubber, and applying the same to an unvulcanized rubber body, and vulcanizing the body and simultaneously uniting the expanded structure thereto by the vulcanization step.

12. The process of making a shoe material adapted to constitute the wearing part of a shoe which comprises preparing a vulcanized expanded structure of comminuted cork and rubber and in condition to remain permanently flat, and applying the flat structure to the surface of an unvulcanized rubber body, and vulcanizing the body and simultaneously uniting the vulcanized expanded structure thereto by the vulcanization step.

13. As an article of manufacture, a flat sheet of vulcanized rubber, forming a base, and a flat vulcanized sheet comprising comminuted cork and rubber united to a portion of the surface of the base, said rubber sheet being initially unvulcanized and said rubber cork sheet being initially vulcanized, and the two sheets united by the vulcanization of said rubber sheet.

14. As an article of manufacture, a layer of vulcanized rubber forming a base and a layer of an expanded and vulcanized structure comprising comminuted cork and rubber united to the surface of the base, said rubber layer being initially unvulcanized and said expanded layer being initially vulcanized, and the two layers united by the vulcanization of said rubber layer.

WILLIAM M. WEST.